(12) United States Patent
Wang et al.

(10) Patent No.: US 12,475,020 B2
(45) Date of Patent: *Nov. 18, 2025

(54) GRAPH ANALYSIS AND DATABASE FOR AGGREGATED DISTRIBUTED TRACE FLOWS

(71) Applicant: eBay Inc., San Jose, CA (US)

(72) Inventors: Hanzhang Wang, San Jose, CA (US); Huai Jiang, San Jose, CA (US); Liangfei Su, San Jose, CA (US); Selcuk Kopru, San Jose, CA (US); Sanjeev Katariya, San Jose, CA (US); Wanxue Li, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,525

(22) Filed: Aug. 10, 2023

(65) Prior Publication Data

US 2023/0385175 A1 Nov. 30, 2023

Related U.S. Application Data

(63) Continuation of application No. 17/209,633, filed on Mar. 23, 2021, now Pat. No. 11,768,755.

(Continued)

(51) Int. Cl.
*G06F 11/00* (2006.01)
*G06F 11/07* (2006.01)
(Continued)

(52) U.S. Cl.
CPC ...... *G06F 11/3476* (2013.01); *G06F 11/0772* (2013.01); *G06F 11/323* (2013.01); *G06F 11/3409* (2013.01); *G06N 20/00* (2019.01)

(58) Field of Classification Search
CPC ............... G06F 11/0772; G06F 11/323; G06F 11/3409; G06F 11/3447; G06F 11/3476; G06N 20/00

See application file for complete search history.

(56) References Cited

U.S. PATENT DOCUMENTS 8,850,172 B2 9/2014 Dietrich et al.
9,684,524 B1 6/2017 Porter et al.
(Continued)

OTHER PUBLICATIONS

Chow et al., "The Mystery Machine: End-to-end performance analysis of large-scale Internet services", OSDI'14: Proceedings of the 11th USENIX conference on Operating Systems Design and Implementation, Oct. 2014, 15 pages.

(Continued)

*Primary Examiner* — Elmira Mehrmanesh
(74) *Attorney, Agent, or Firm* — Shook Hardy & Bacon L.L.P.

(57) ABSTRACT

Technologies are shown for generating process flow graphs from system trace data that involve obtaining raw distributed trace data for a system, aggregating the raw distributed trace data into aggregated distributed trace data, generating a plurality of process flow graphs from the aggregated distributed trace data, and storing the plurality of process flow graphs in a graphical store. A first critical path can be determined from the plurality of process flow graphs based on an infrastructure design for the system and a process flow graph corresponding to the first critical path provided for graphical display. Certain examples can determine a second critical path involving a selected element of the first critical path and provide the process flow graph for the second critical path for display. Some examples pre-process the aggregated distributed trace data to repair incorrect traces. Other examples merge included process flow graphs into longer graphs.

17 Claims, 15 Drawing Sheets

Related U.S. Application Data

(60) Provisional application No. 62/993,426, filed on Mar. 23, 2020.

(51) Int. Cl.
  *G06F 11/32* (2006.01)
  *G06F 11/34* (2006.01)
  *G06N 20/00* (2019.01)

(56) References Cited

U.S. PATENT DOCUMENTS

| | | |
|---|---|---|
| 9,916,232 B2 | 3/2018 | Voccio et al. |
| 11,768,755 B2 | 9/2023 | Wang et al. |
| 2014/0215443 A1 | 7/2014 | Voccio et al. |
| 2014/0380282 A1 | 12/2014 | Ravindranath et al. |
| 2015/0120959 A1 | 4/2015 | Bennett et al. |
| 2017/0031980 A1 | 2/2017 | Kamfonas |
| 2017/0250890 A1 | 8/2017 | Puls et al. |
| 2017/0337123 A1 | 11/2017 | Wang |
| 2018/0123918 A1 | 5/2018 | Steinhauser et al. |
| 2019/0361766 A1 | 11/2019 | Cardoso et al. |
| 2020/0192994 A1 | 6/2020 | Gupta et al. |
| 2021/0232584 A1 | 7/2021 | Chung et al. |
| 2021/0294717 A1 | 9/2021 | Wang et al. |
| 2021/0391040 A1 | 12/2021 | Dormer et al. |
| 2022/0103433 A1 | 3/2022 | Akhilesham et al. |

OTHER PUBLICATIONS

Hanzhang et al., "Flomo—Graph-based Distributed Tracing Flow Monitoring", Feb. 3, 2020, 3 pages.

Santana et al., "Transparent tracing of microservice-based applications", Proceedings of the 34th ACM/SIGAPP Symposium on Applied Computing, SAC 2019, Limassol, Cyprus, Apr. 8-12, 2019, pp. 1252-1259.

Sigelman et al., "Dapper, a Large-Scale Distributed Systems Tracing Infrastructure", Google Technical Report dapper-2010-1, Apr. 2010, 14 pages.

```
200

47259.2 msec.    94518.4 msec.
-r1reco             106 msec. Ginger.pl.SpliceService.POST  10.195.211.124
        -r1plsim1   102 msec. replacement  10.153.189.251
-r1reco             30 msec. Ginger.mbe.COMPService.GET  10.195.211.124
-r1reco             45 msec. Ginger.pgs.v1.PGSClient.GET  10.195.211.124
        -r1prodsrvc 43 msec. GET /catalog/v2/product/getbyepids [DS]  10.153.189.251
-r1reco             44 msec. Ginger.mbe.COMPService.GET  10.195.211.124
-r1reco             42 msec. Ginger.mbe.COMPService.GET  10.195.211.124
-r1reco             53 msec. Ginger.scandal.ScandalService.POST  10.195.211.124
-r1reco             77 msec. Ginger.pl.PLSIMSService.POST  10.195.211.124
        -r1plsim1   73 msec. replacement  10.202.75.136
                    9 msec. Ginger.tora.coview.v1.ToraCoviewsServiceClient.GET  10.202.75.136
        -r1nrtlstg  7 msec. nrtlstg.coview.v1  10.156.175.33
```

FIG. 2

GRAPH ANALYSIS AND DATABASE FOR AGGREGATED DISTRIBUTED TRACE FLOWS

CROSS-REFERENCE TO RELATED APPLICATIONS

This patent application is a continuation of U.S. patent application Ser. No. 17/209,633, filed Mar. 23, 2021 (issued as U.S. Pat. No. 11,768,755), which claims priority to U.S. Provisional Patent Application No. 62/993,426, filed Mar. 23, 2020. Each of the aforementioned applications is herein incorporated by reference in its entirety for all purposes.

BACKGROUND

Modern services, such as services and applications accessible via the Internet, are typically implemented in complex, large-scale distributed systems. These service or applications are constructed from collections of software modules that may be developed by different teams, perhaps in different programming languages, and can reside or execute on a large number of machines resident in different physical facilities.

In recent implementations, previously monolithic applications are shifting to the use of loosely coupled microservices and pose new challenges to existing tracing and performance analysis systems. Distributed tracing can be adopted for service-oriented systems to profile and monitor application components. Tracing data helps to pinpoint where failures occur and what causes poor performance.

One example of a tool for tracing and monitoring in distributed systems infrastructure is Dapper, which is a production distributed systems tracing infrastructure utilized by GOOGLE INC. of Mountain View, Calif. (See Google Technical Report dapper-2010-1, April 2010 at https://static.googleusercontent.com/media/research.google.com/en//archive/papers/dapper-2010-1.pdf.)

Another example of performance analysis tools for measuring and uncovering performance insights about complex, heterogeneous distributed systems is discussed by Chow, et al. in "The Mystery Machine: End-to-end performance analysis of large-scale Internet services" OSDI 2014 at https://www.usenix.org/system/files/conference/osdi14/osdi14-paper-chow.pdf. This paper discusses tools that are applied to the FACEBOOK Web pipeline for service provided by FACEBOOK, INC. of Menlo Park, Calif. In the approach described therein, end-to-end performance is measured from a point when a user initiates a page load in a client Web browser, through server-side processing, network transmission, and JavaScript execution, to a point when the client Web browser finishes rendering the page.

Examples of intrusive and non-intrusive tracing collection techniques are discussed in Santana, et al. "Transparent tracing of microservice-based applications," Proceedings of the 34th ACM/SIGAPP Symposium on Applied Computing, SAC 2019, Limassol, Cyprus, Apr. 6-12, 2019. 1252-1259. (See https://doi.org/10.1145/3295280.3297403.)

Some entities are providing tools for tracing and graph visualization. One example is SIGNALFX of San Mateo Calif., which provides a Software-as-a-Service (SaaS) based monitoring and analytics platform based that allows customers to analyze, visualize, automate, and alert on metrics data from infrastructure, applications, microservices, containers, and functions. This platform involves a streaming architecture that splits metric data points into two streams, one for human readable metadata and the other for time-series values. The data is routed through a pub-sub bus to SignalFlow, a python-like analytics language accessible through the main SignalFx GUI and through programmable API's. This platform can process millions of data points per second at 1-second resolution with less than 2 seconds of latency, from ingestion to alert.

Another example is JAEGER, which is an open-source tracing system for microservices that is used to monitor, profile, and troubleshoot microservices that are supported by the Cloud Native Computing Foundation (CNCF). The system can provide distributed tracing, root cause analysis, service dependency analysis.

Such data tracing tools can be implemented for the collection and storage of trace data based on Client Access Licenses (CAL) for eBay systems. However, this trace data can be difficult to understand and visualize for large-scale service-oriented systems using flow-based monitoring tools or automated anomaly detection based on aggregated tracing data. Examples of the challenges involving this data include the following:

1. Tracing data quality is not ideal—due to lack of compliance and implementation consistency. Examples of such problems can include: an incomplete trace caused by not using a specified framework or using it irregularly; a broken trace caused by using old versions of a Remote Procedure Call (RPC) framework; and a wrong trace caused by span information that is logged incorrectly or an RPC framework that is used irregularly.

2. The tracing paths are highly dynamic (e.g. changing regularly as a normal pattern), or unstable (e.g. prone to change irregularly as an abnormal pattern). There is currently no knowledge or method to classify or distinguish a dynamic pattern versus an unstable anti-pattern. Moreover, the tracing data is at log-level, so the volume of data is huge to process.

3. Data loss during integration. For example, generated aggregated tracing generated based on the passing APIs or path conditions, wherein, due to the abovementioned challenges, the aggregated tracing data to be consumed can be less accurate.

It is with respect to these and other considerations that the disclosure made herein is presented.

SUMMARY

Technologies are disclosed herein for graph analysis and graph database storage for aggregated distributed trace flows. In the disclosed technology, generally speaking, raw and aggregated distributed trace data can be generated and stored in a graph database. Trace flow graphs of the aggregated distributed trace data can be generated (e.g. manual or batch-updated) to discover business flows. The discovered business flows can be visualized for use in designing, developing and monitoring large scale micro-service environments.

In certain simplified examples of the disclosed technologies, a method, system or computer readable medium for generating process flow graphs for a system from system trace data is shown involving obtaining raw distributed trace data for a system, aggregating the raw distributed trace data into aggregated distributed trace data, generating process flow graphs from the aggregated distributed trace data, and storing the process flow graphs in a graphical store. These examples further involve determining a first critical path from the process flow graphs based on an infrastructure design for the system and providing a process flow graph corresponding to the first critical path for graphical display.

In certain examples, the operation of determining a first critical path from the process flow graphs based on performance data is composed of determining a first critical path based on an infrastructure design for the system and at least one of a traffic volume, an error rate, and a latency for at least one element of each of the process flow graphs. Still other examples involve pre-processing the aggregated distributed trace data to repair at least one trace that is incomplete, broken or incorrect.

Other examples of the disclosed technology further include merging a first process flow graph with a second process flow graph when the second process flow graph includes the first process flow graph and the second process flow graph is longer than the first process flow graph.

In particular examples of the disclosed technology, the operation of providing the critical path for graphical display includes providing performance data for at least one element of the process flow graph corresponding to the first critical path for graphical display.

Still other examples of the disclosed technology include receiving a selection of an element of the process flow graph corresponding to the first critical path, determining a second critical path involving the selected element, and providing the process flow graph corresponding to the second critical path for graphical display.

Yet other examples of the disclosed technology include receiving a selection of an element of an infrastructure design for the system and the operation of determining a first critical path from the plurality of process flow graphs based on an infrastructure design for the system involves determining a first critical path from the process flow graphs based on the selected element of the infrastructure design for the system.

Certain examples of the disclosed technology include applying machine learning to the aggregated trace data, determining a set of expected performance data for one or more of the plurality of process flow graphs based on the machine learning, detecting when recently collected performance data for one of the process flow graphs diverges from the set of expected performance data for the process flow graph, and generating an anomalous event notification for the process flow graph detected to have recently collected performance data that diverges from the set of expected performance data.

Further examples of the disclosed technology include applying machine learning to the aggregated trace data, determining a set of expected performance data for one or more of the process flow graphs based on the machine learning, and providing the set of expected performance data for display.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2 is a schematic diagram illustrating an example of incorrect trace data with multiple roots;

DETAILED DESCRIPTION

Figure 1A:
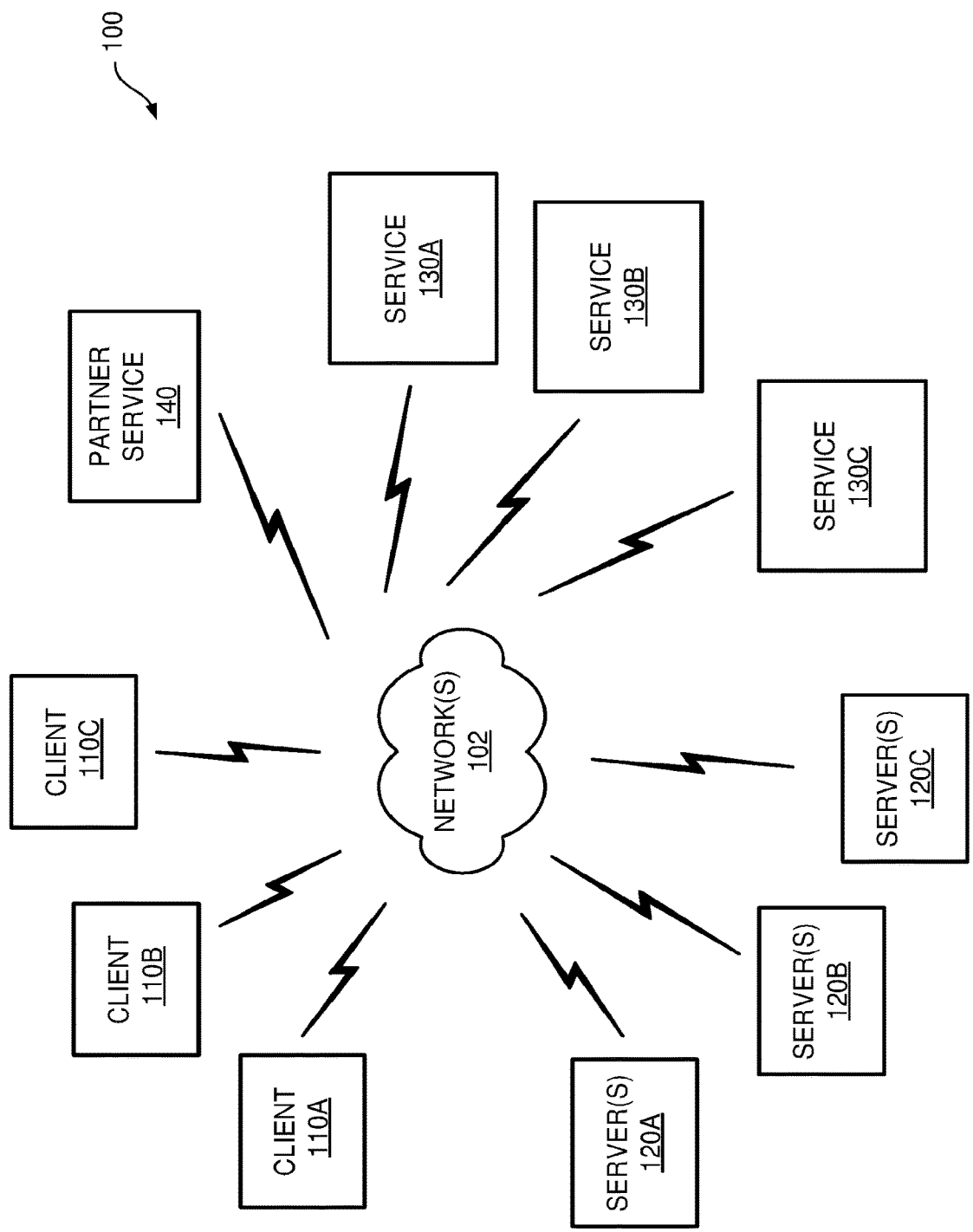
FIG. 1A is a system architecture diagram showing an illustrative example of an environment suitable for application of graph analysis of aggregated trace flows in accordance with the disclosed technology.

Generally, collection and analysis of tracing data can be beneficial. In Site Reliability Engineering (SRE) and Security Engineering Control (SEC), it can be beneficial that a root cause of a site incident be quickly identified in order to rapidly take action to recover the site. In site architecture, it can be useful to trace flows to recognize when services are suffering from anti-patterns that should be refactored to reduce "tech debt" (e.g. code that will need to be maintained/improved later) and improve customer experiences. For developers, it can be beneficial to trace multiple process or business flows through a service element or endpoint. For SRE and SEC site monitoring or a service team leader, it can be beneficial to monitor different program flows through a service element and trace end to end program flows to detect problems in the flow and identify other services that need to be contacted to address problems. It can also be beneficial to trace flows for features that are enabled in a service oriented architecture.

Fundamentally, analyzing the performance of concurrent systems requires a model of application behavior that includes the causal relationships between components, e.g. happens-before ordering and mutual exclusion. While the conventional techniques for performing such analysis (e.g., critical path analysis) are generally well-understood, prior systems make assumptions about the ease of generating the causal model that generally do not hold in many largescale, heterogeneous distributed systems commonly in use.

Further, in the conventional tracing and visualization solutions described above, the tracing data is generally not processed as aggregated traces.

In the disclosed technology, generally speaking, raw distributed trace data is collected and aggregated. The aggregated distributed trace data can be pre-processed to repair incomplete, broken or incorrect traces. Process flow graphs can be generated from the aggregated distributed trace data to discover processing flows, e.g. processing flows in business systems, and stored in a graphical data store for access via graphical search tools. The process flow graphs can be visualized for use in designing, developing and monitoring large scale micro-service environments.

The disclosed technology can provide many beneficial technical effects. For example, the disclosed technology can provide graphical tools that aid in understanding system behavior and analysis of performance issues in a largescale micro-services system environment. In some examples, the disclosed technology can provide process flow graphs for graphical display, which can improve user visualization of complex system functions and improve the user's effectiveness and efficiency in recognizing critical paths and fault isolation.

In particular examples of the disclosed technology, the critical paths can be determined based on an infrastructure design of a system to further improve the user's comprehension of the system and more quickly and effectively identify inefficient or faulty process flows. In other examples of the disclosed technology, critical paths be further determined based on performance data for elements of the system. In still other examples of the disclosed technology, the user can select an element of a first critical path and obtain a process flow graph of a second critical path to further improve the user's comprehension of a complex system and more quickly and effectively identify inefficient or faulty process flows in the complex system Certain examples of the disclosed technology can pre-process the aggregated distributed trace data to repair incorrect trace data, such as incomplete, broken or wrong traces, and improve the quality of the aggregated distributed trace data used for graphical analysis of a complex system.

Other examples of the disclosed technology can merge included process flow graphs into longer graphs to reduce data storage requirements and improve storage efficiency.

Particular examples of the disclosed technology can utilize machine learning to determine expected performance data for a complex system for comparison to actual performance data or to quickly and efficiently detect anomalous data events.

Other technical effects other than those mentioned herein can also be realized from implementation of the technologies disclosed herein.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for graph analysis of aggregated trace flows will be described. As will be described in more detail below with respect to the figures, there are a number of applications and services that may embody the functionality and techniques described herein.

FIG. 1A is a system architecture diagram showing an illustrative example of an environment 100 suitable for application of graph analysis of aggregated trace flows in accordance with the disclosed technology. In environment 100, clients 110 can communicate with servers 120 via network 102. Servers 120 can further communicate with services 130 via network 102. Some of services 130 can reside on servers 120, reside on other platforms, such as cloud processing platforms, or in a mix of environments, such as certain services residing on a server 120 with other services or microservices residing on other platforms.

Services 130 can communicate with partner service 140 via network 102. Examples of partner services can include searching, payment processing, and shipping among others.

Clients 110 can interface with servers 120, e.g. via application program interfaces (APIs), to perform business processes on eCommerce platforms. Servers 120 can utilize services 130 to service client requests. Services 130 can include multiple microservices, which can be utilized to service client requests.

Figure 1B:
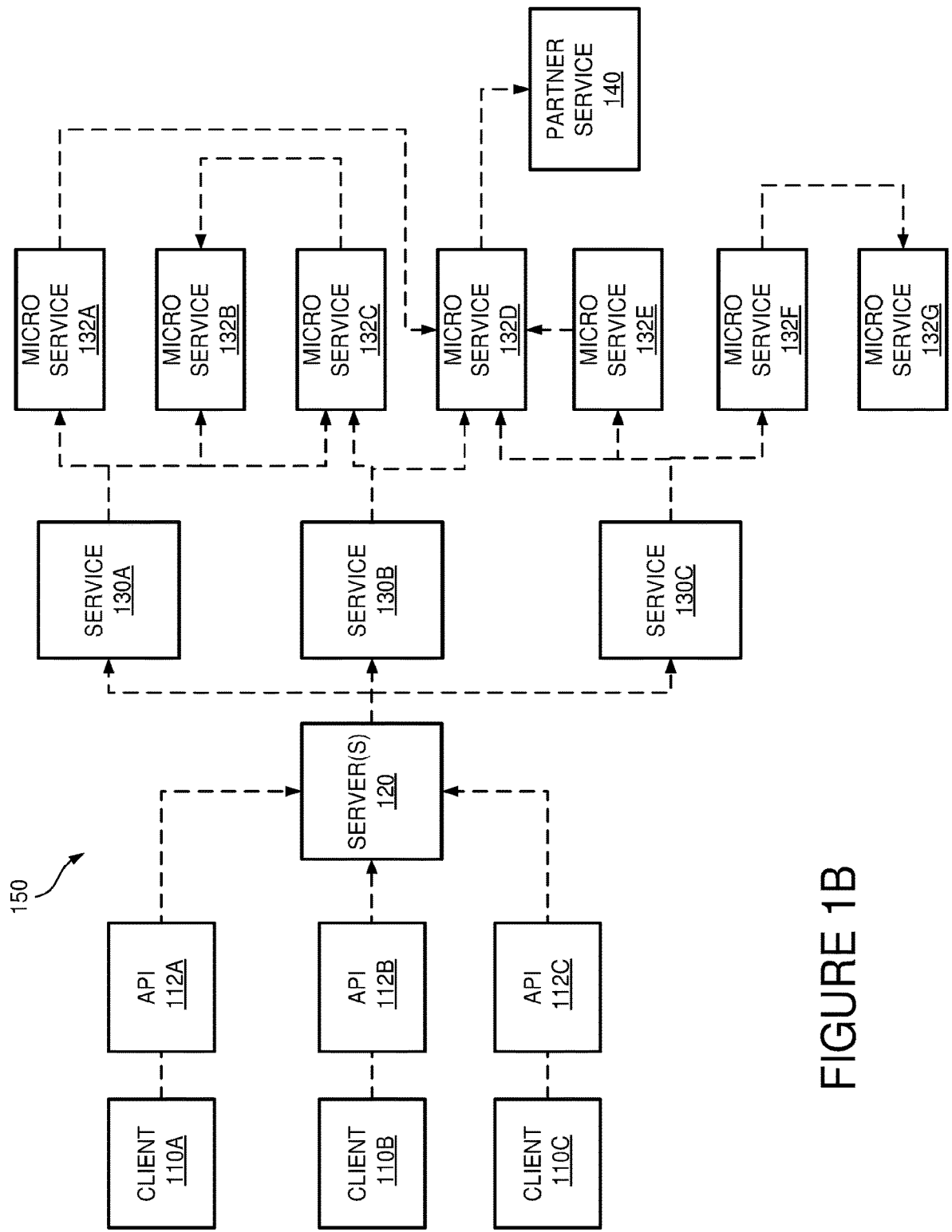
FIG. 1B is a data architecture diagram showing an illustrative example of service and microservice calls in the environment of FIG. 1A suitable for application of graph analysis of aggregated trace flows in accordance with the disclosed technology.

FIG. 1B is a data architecture diagram showing an illustrative example of service and microservice call sequences 150 that can arise from the system infrastructure architecture of the environment 100 of FIG. 1A. In this example, clients 110 utilize APIs 112 to access servers 120. Servers 120 invoke services 130 to service requests received from clients

110. Services 130, in turn, can invoke microservices 132 in order to process the requests. Some of micro-services 132 can access partner service 140.

Figure 1C:
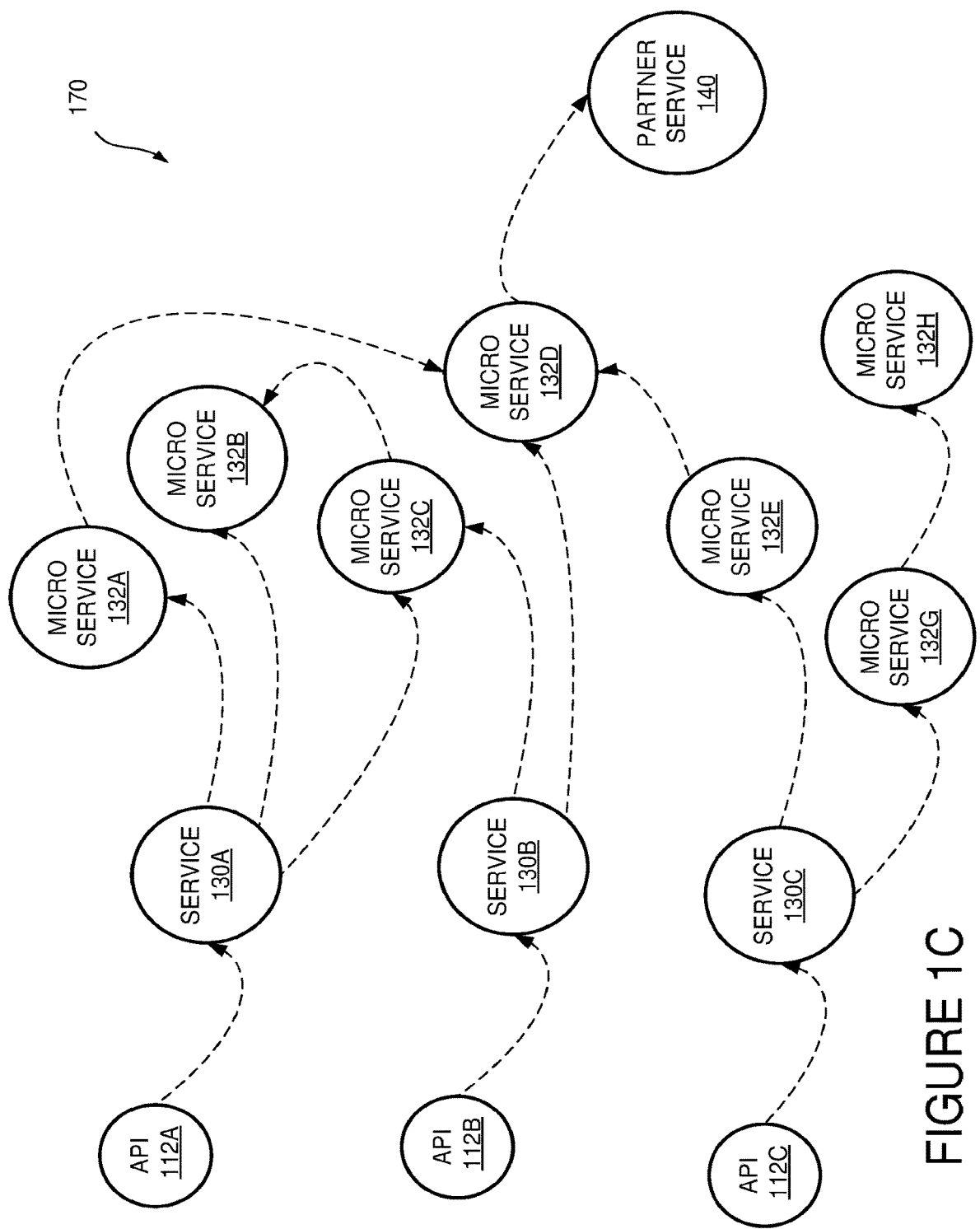
FIG. 1C is a call flow diagram illustrating process flows in the example of service and micro-service calls in the example of FIG. 1B.

FIG. 1C is a call flow diagram 170 that illustrates examples of process flows in the example of FIG. 1B. In this example, one possible process flow in response to a client request from client 110B that is received by server 120 through API 112B involves server 120 invoking service 130B, which invokes micro-service 132D to access partner service 140. Another possible process flow involves server 120 invoking service 130A, which calls micro-service 132A, which calls micro-service 132D to access partner service 140. Yet another possible process flow involves server 120 invoking service 130C, which calls micro-service 132D to access partner service 140. However, service 130C can also invoke micro-service 132E, which can call micro-service 132D to access partner service 140.

The micro-service architecture example of FIGS. 1A-C illustrate is relatively simple compared to the highly complex micro-service architectures commonly implemented for process flows such as searching, eCommerce or other complex business processes. Nonetheless, even the simplified micro-service architecture example of FIGS. 1A-C illustrates that process flows can be complicated and difficult to predict or visualize for developers, or SRE and SEC or service site monitoring.

Further, as noted above, the distributed trace data collected for a system can often be incorrect. FIG. 2 is a schematic diagram illustrating an example of incorrect trace data with multiple roots. For example, incorrect trace data can arise due to an incomplete trace caused by not using a specified framework or using it irregularly, a broken trace caused by using old versions of an RPC framework or a wrong trace caused by span information that is logged incorrectly or an RPC framework that is used irregularly. As discussed below, the trace data can be pre-processed to address some of these quality issues. Pre-processing the trace data can improve the graph analysis that can be performed on the trace data.

Figure 3A:
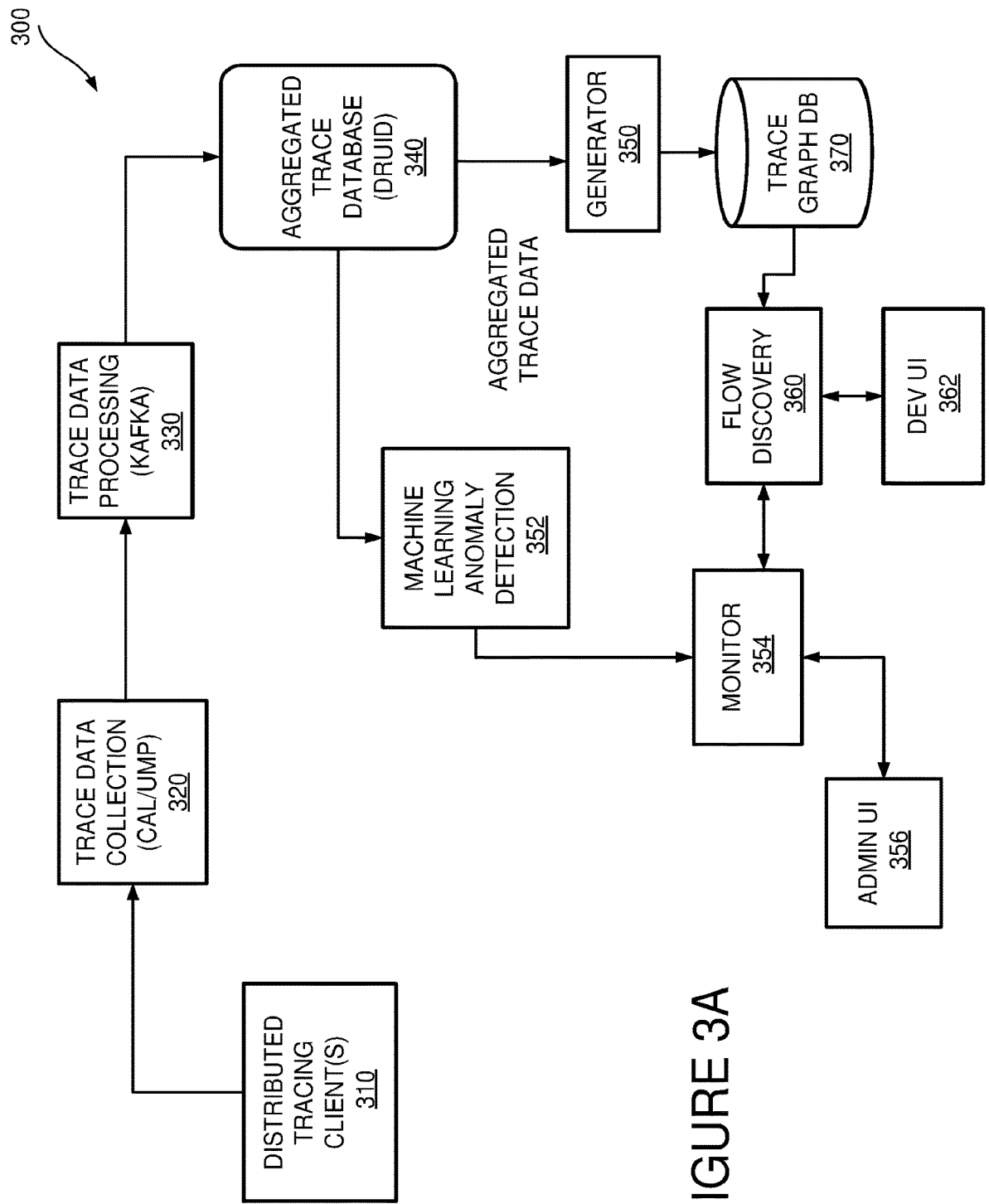
FIG. 3A is a functional block diagram showing an illustrative example of a system for graph analysis of aggregated trace flows in accordance with the disclosed technology.

FIG. 3A is a functional block diagram showing an illustrative example of a system 300 for graph analysis of aggregated trace flows in accordance with the disclosed technology. A data collection front end of system 300 collects distributed streaming and batch distributed trace data that is stored as aggregated data. The aggregated distributed trace data can be pre-processed to correct some incorrect trace data and the aggregated distributed trace data analyzed to produce trace flow graphs in accordance with the disclosed technology.

In this example, distributed tracing clients 310, such as CAL and Upward Message Passing (UMP) clients, collect system trace data that is provided to trace data collection module 320. The trace data can be further processed, e.g. Kafka, by trace data processing engine 330 for storage in an aggregated distributed trace database, e.g. a Druid based database. For example, a CAL client can collect streaming trace data that is provided to a CAL ingress node and other tracing clients can provide batch trace data to a UMP ingress node and the combined trace data processed to produce aggregated distributed trace data.

In this example, individual traces are aggregated by real-time streaming and graph computing. Requests and their complete traces of a site are aggregated into flows. Graph algorithms and analysis can be used to handle large amounts of data and reduce the typically high levels of noise. Based on the traffic volume reflected in the aggregated distributed trace data, graph search, graph analysis, and graph connectivities can be utilized to resolve quality issues and detect important flows.

At this point, the trace data can be pre-processed to address some of the three quality issues mentioned above: incomplete traced, broken traced, or wrongly traced. First, these quality issues can be identified from the trace level data based on the aggregated results and additional information, such as calling a dependency graph (e.g. data sources not related to the collection of trace), and further based on timestamp data. Link prediction methods can also be used to repair traces with quality problems. Although the repaired traces may not be completely correct due to concurrency issues, etc., the disclosed technology can improve the accuracy of the aggregation results.

After pre-processing, trace flow generator 350 can generate trace flow graphs from the aggregated distributed trace data in database 340, which are stored in trace graph database 370. For example, a SRE/SEC/Platform owner can identify one or more critical APIs for a process flow. For example, the implication is if the customer requests are fulfilled by a set of micro-services that contain these APIs, then the requests belong to the same processing or business purpose or process (e.g. payment, selling, shipping, etc.). During a streaming processing phase, individual traces can be aggregated together using this information provided regarding critical APIs. For example, for a process flow for a purchase process, the metric groups that are aggregated can be latency, error count and TPS.

In other examples, a system micro-service architecture specification, e.g. service and micro-service naming and interface data, can be provided to generator 350, which identifies critical process flow graphs from the architecture specification data and the aggregated distributed trace data. The resulting trace flow graphs are stored in trace graph database 370.

Once the process flows are generated by 350, the trace flow graphs can be provided to a user interface (UI) having features that enable a user to quickly discover flow by a given pool(s) or API(s). The UI permits users to visualize the trace flow graphs in order to understand the role that one or more elements play within the micro-services architecture. The UI can also be used to discover technical debt, architectural anti-patterns (e.g. a cyclic dependency or a god service).

In addition, machine learning can be applied in machine learning anomaly detection module 352 to the aggregated distributed trace data from aggregated distributed trace database 340 in order to identify anomalous conditions in the trace data. An anomaly detected by module 352 can be provided to monitor module 354 to generate an alert to an administrative user via admin UI 356.

Figure 3B:
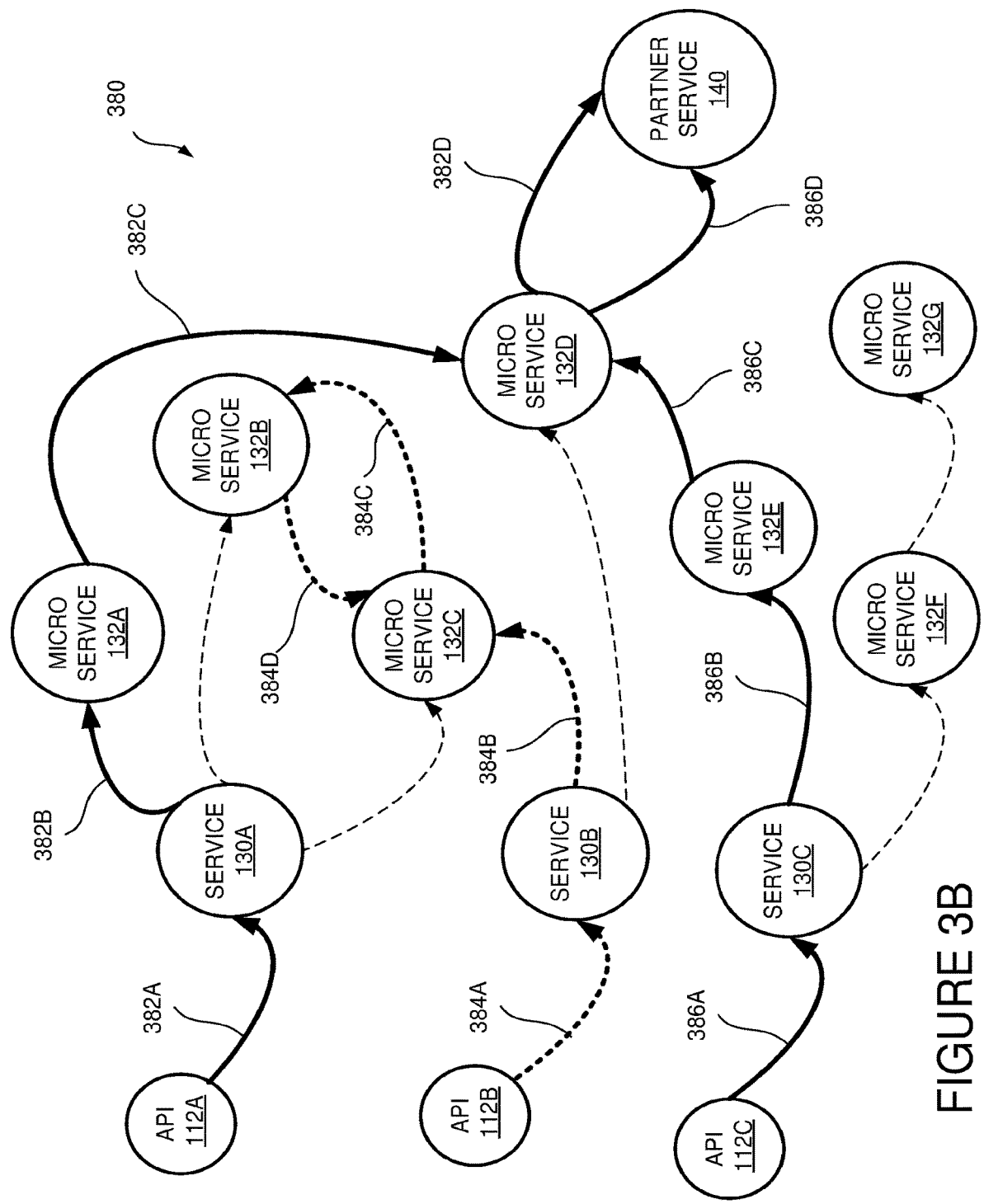
FIG. 3B is a call flow diagram illustrating an example of critical paths identified by graph analysis of aggregated trace flows in accordance with the disclosed technology.

FIG. 3B is a call flow diagram illustrating an example of trace flow graphs with critical paths identified by graph analysis of aggregated trace flows in accordance with the disclosed technology that can be provided to a UI for display to a user, such as a developer, e.g. developer UI 362, or SRE/SEC/Platform administrator, e.g. admin UI 356. The trace flow graphs generated from the aggregated distributed trace data and architectural data and stored in trace graph database 370 can be provided for display to the user in graphical form on a UI to allow the user to visualize the process flows for the system.

In the example of FIG. 3B, the trace flow graphs representing the process flows in the architecture of FIGS. 1A-C are displayed to a user. For example, the process flow from API 112A to service 130A, through micro-services 132A and 132D to partner service 140 is illustrated in graphical form. Similarly, calls from service 130A to micro-services 132B and 132C are shown along with calls from micro-service 132B to micro-service 132C and from micro-service 132C to micro-service 132B.

In some examples, critical paths are identified, e.g. based on traffic volume, system architecture or other data, and are highlighted in the graphical display provided to the user. In certain examples, a critical API entry point, root point or endpoint, such as partner service 140, can be selected, e.g. via a UI input, and utilized to identify critical paths in a process flow or select process flow elements for further analysis.

For example, user input from admin UI 356 can flow through monitor module 354 to flow discovery module 360. User input from developer UI 362 also flows to flow discovery module 360. Based on user input, e.g. selection of elements, navigation inputs, or other data requests, flow discovery module 360 can obtain additional trace flow graph data or performance data from database 370 and provide the additional data in graphical format for display via UIs 356 and 362.

In the example of FIG. 3B, the process flow 382 from API 112A to partner service 140 is highlighted, e.g. using thicker graphical lines, colors or other characteristics, for easier recognition by the user. Thus, the edges 382A-D are rendered with solid, thicker graphical lines in this example. Similarly, the process flow 386 from API 112C to partner service 140 is identified as critical and edges 386A-D rendered with solid, thicker graphical lines.

The graphical process flow information provided to the user can also identify anomalous process flows. For example, the process flow 384 from API 112B through service 130B (edge 384A), to microservice 132C (edge 384B), to microservice 132B (edge 384C), and back to microservice 132C (edge 384D) may be problematic due to the cyclical calls between microservices 132C and 132D. Thus, the edges 384A-D of process flow 384 are distinctively rendered with dotted, thicker graphical lines to visually highlight the anomalous process flow 384 to the user via the UI.

Additional data and analysis can be provided by flow explorer module 360 for display to the user via UIs 352 and 362. For example, performance data, such as high latency or error rates, can be provided for display graphically, e.g. highlighting an edge, or textually. In addition, expected performance data for elements in process flows can be predicted, e.g. in monitor module 354, and presented to a user via a UI for comparison to actual performance data.

By way of further example, using a service API or dynamic queries generated and triggered by user selections or clicks on elements of an existing graph, the UI can be used to interactively show the API level flows, pool level flows, or components under a discovered process flow. The aggregated flow data can be stored in a graphical database so that it can be consumed in graphical form, e.g. through graph queries, graphQL, etc.

In another example, the disclosed technology can provide change impact analysis with production data (e.g. the latency/traffic metrics variation introduced by change) for presentation to a user via a UI. For example, a graph node can be a rendered as a block to represent an API in a specific pool. The block can be rendered in red block to indicate a latency decrease or to alert that a call relation has disappeared. Similarly, a red arrow can be rendered to indicate a traffic decrease with respect to a node or edge. Using the UI approach of the disclosed technology, high dimensional anomaly detection and site architecture evolution and corruption analysis can be performed.

In some examples, for critical or selected (e.g. by a domain team) business flows, real-time metrics (e.g. TPS, Error count, latency, etc.) can be projected onto the flow, and (as a next step) plan to link the business metrics of the given flow (e.g. checkout to checkout flow).

In one example, by leveraging the Jaeger UI, existing pool-based monitoring may be evolved into API-based and flow-based monitoring. In a microservice architecture, troubleshooting can be made easier and be performed more quickly, which leads to improved ATB.

Figure 4A:
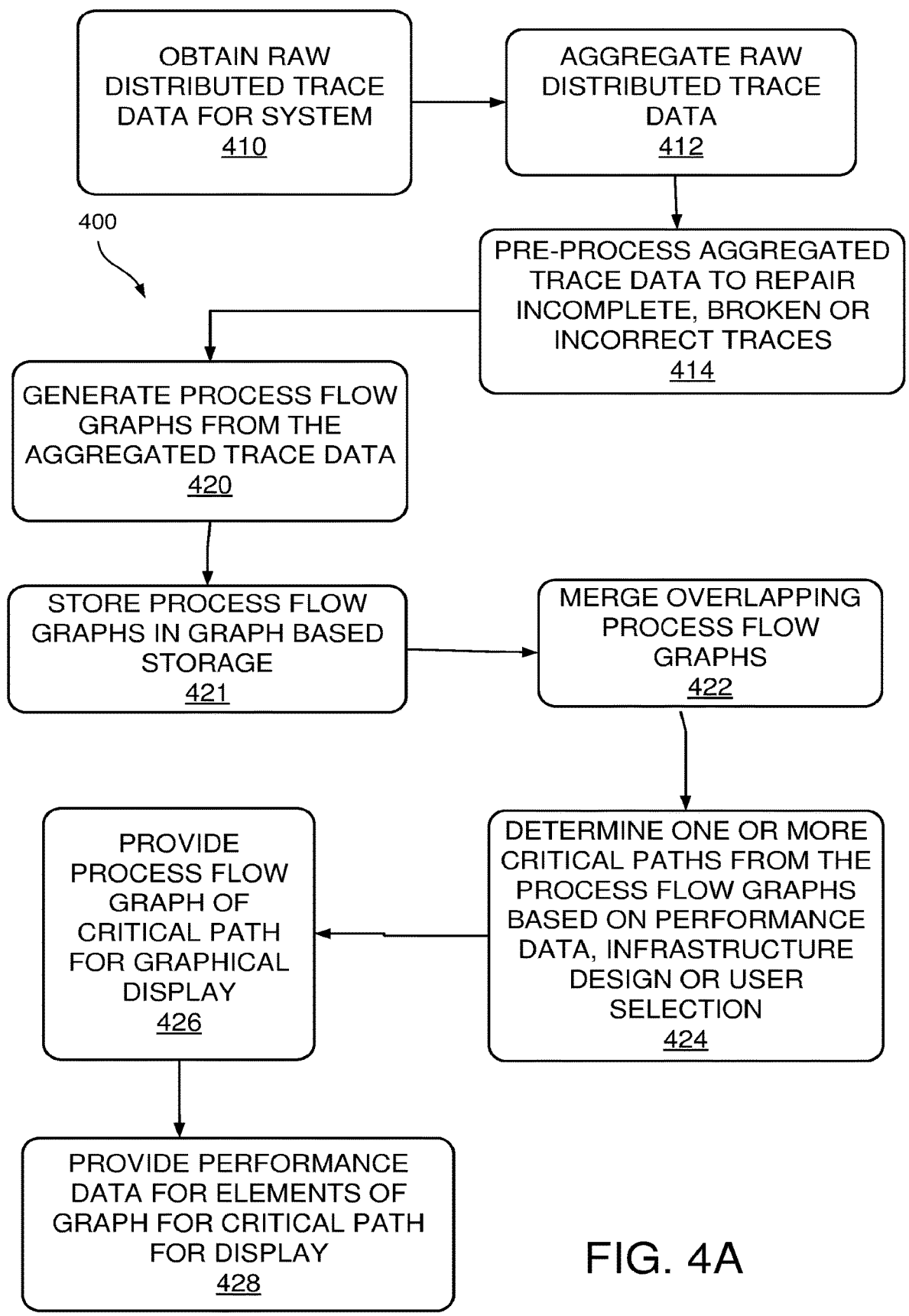
FIG. 4A is a control flow diagram showing an illustrative example of a process for graph analysis of aggregated trace flows in accordance with the disclosed technology.

FIG. 4A is a control flow diagram showing an illustrative example of a process 400 for graph analysis of aggregated trace flows in accordance with the disclosed technology. At 410, raw distributed trace data is obtained for a system, such as by receiving streamed or batch distributed trace data from CAL trace collection clients in the system. At 412, the raw distributed trace data is aggregated, such as by storing the raw distributed trace data in a Druid based aggregated distributed trace database 340. At 414, the aggregated distributed trace data can be pre-processed to repair incomplete, broken or incorrect traces, such as by using system architecture specification data, e.g. a dependency graph for the system, timestamp data, or other data.

At 420, process flow graphs are generated from the aggregated distributed trace data, such as by utilizing graph processing and analysis algorithms, which can reduce noise in the data and process large volumes of data. At 421, the process flow graphs are stored in graph based storage, which can permit the process flow graph data to be accessed using graph queries, graphQL or other graphically based search tools. At 422, overlapping process flow graphs can be merged together to reduce the number of process flow graphs stored.

At 424, one or more critical paths are determined from the process flow graphs based, for example, on performance data, infrastructure design, e.g. an architecture specification or dependency graph, or selection of graph elements, e.g. user input selections. For example, a graph query pertaining to a particular graph element can be submitted to graph based storage to obtain one or more process flow graphs involving the particular graph element. The particular graph element can, for example, be determined by user selection of the element, performance data pertaining to the element, e.g. high traffic volume, or infrastructure design, e.g. an entry point, end point or convergent node in a dependency graph for the system.

At 426, the process flow graph for one or more critical paths is provided for graphical display to a user. At 428, in certain examples, performance data for elements of the process flow graphs can also be provided for display to a user.

Figure 4B:
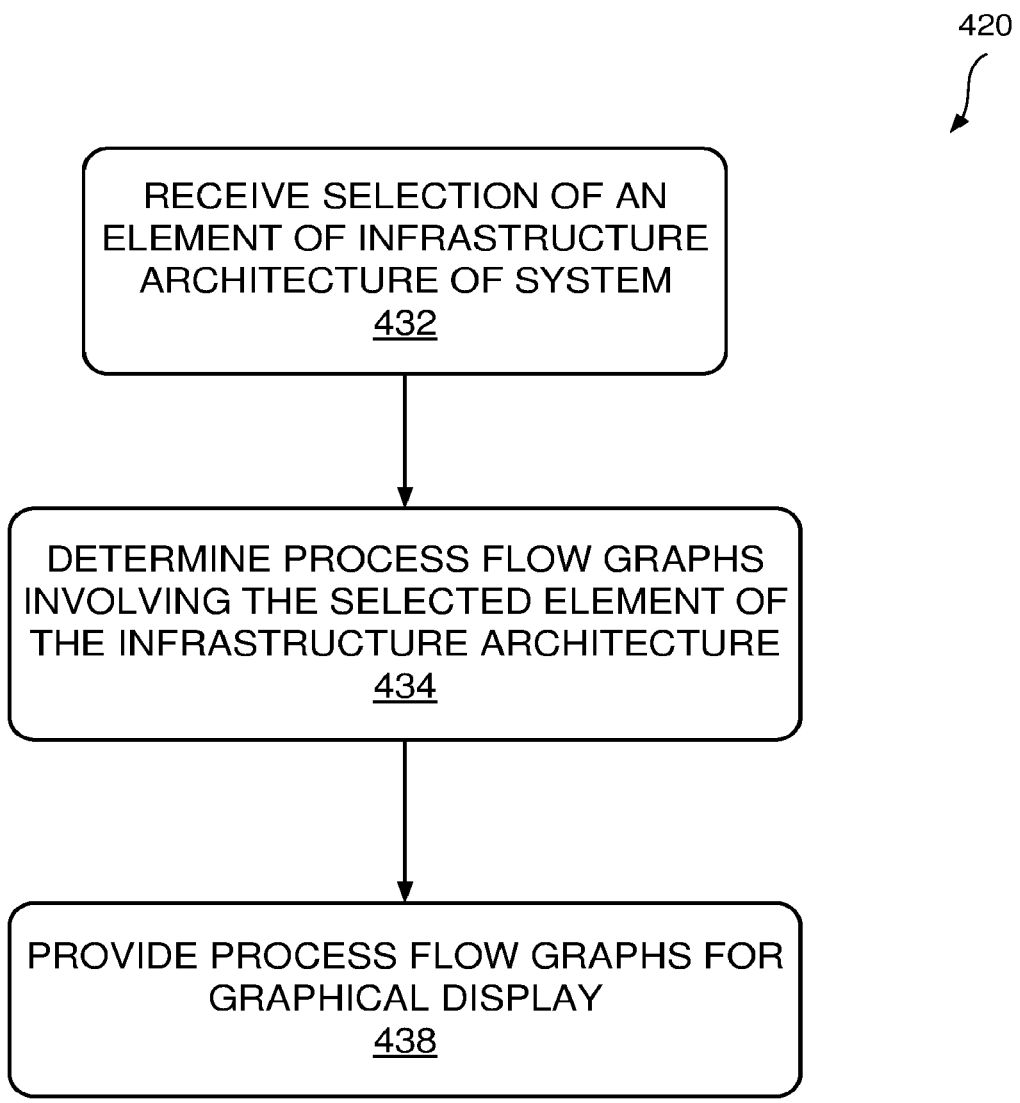
FIG. 4B is a control flow diagram illustrating an example of a process for determining process flow graphs based on a selected element of an infrastructure architecture in accordance with the disclosed technology.

FIG. 4B is a control flow diagram illustrating an example of a process 420 for determining process flow graphs based on a selected element of an infrastructure architecture in accordance with the disclosed technology. The selection can be provided through user input via a UI or otherwise defined.

At 432, the selection of an element, e.g. an entry point, micro-service or endpoint, of an infrastructure architecture for a system is received. At 434, one or more process flow graphs involving the selected element of the infrastructure architecture are determined. At 438, the process flow graphs are provided for graphical display to a user via a UI.

Figure 4C:
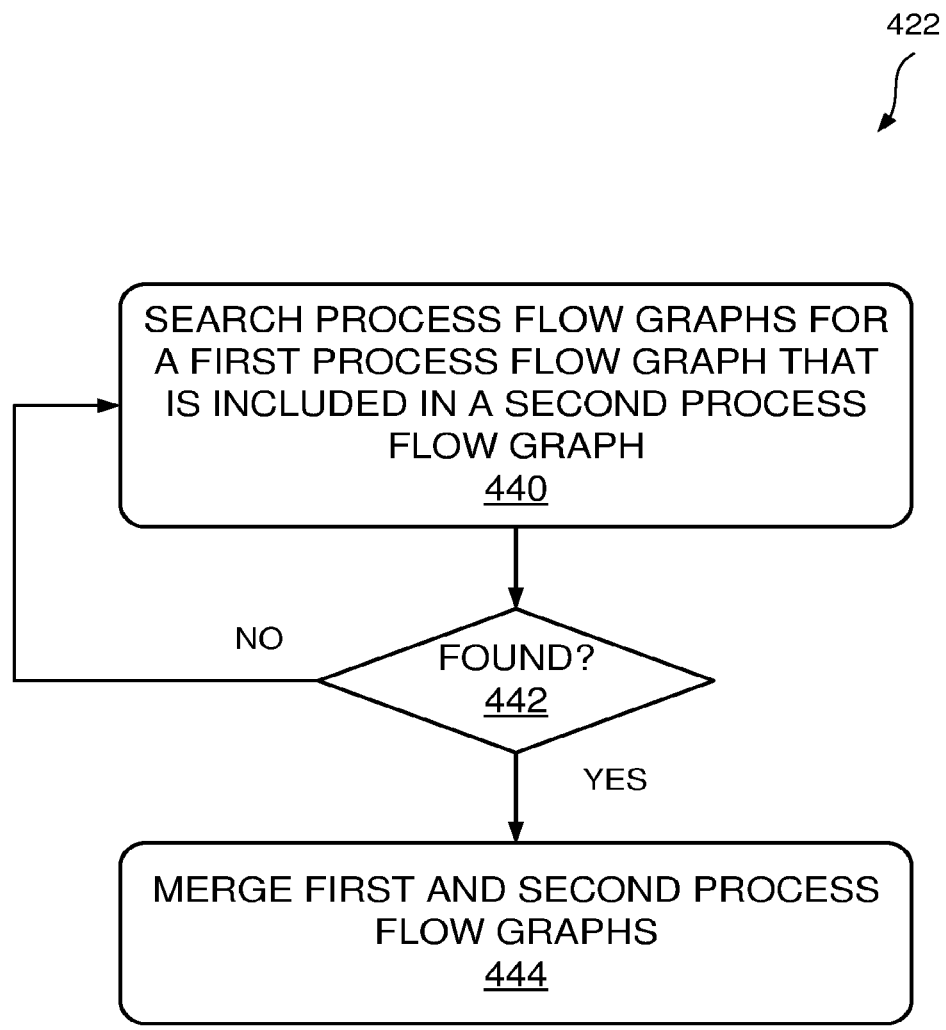
FIG. 4C is a control flow diagram illustrating an example of a process for pre-processing process flow graphs to merge included graphs in accordance with the disclosed technology.

FIG. 4C is a control flow diagram illustrating an example of a process for operational step 422 of FIG. 4A for merging included process flow graphs in accordance with the disclosed technology. At 440, the process flow graphs are searched for a first process flow graph that is included in a second process flow graph. If such a first process flow graph is found, then control branches at 442 to 444 to merge the first and second process flow graphs in a graphical trace database. Process 422 can continue searching the process flow graphs in the graphical trace database until all included process flow graphs have been merged into the process flow graph in which they are included.

Figure 4D:
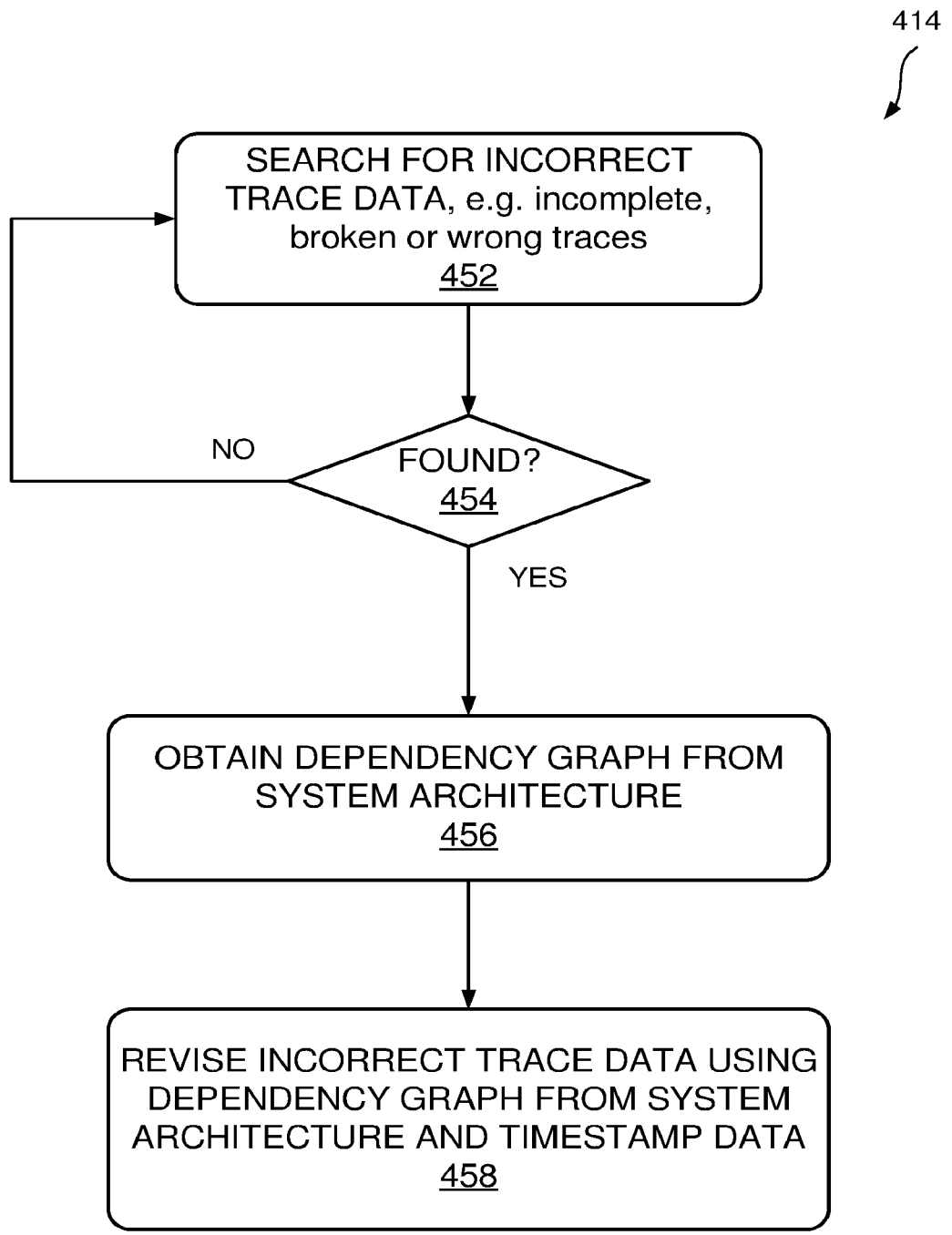
FIG. 4D is a control flow diagram illustrating an example of a process for pre-processing trace data to revise incorrect trace data in accordance with the disclosed technology.

FIG. 4D is a control flow diagram illustrating an example of a process for the operation step 414 of FIG. 4A for pre-processing aggregated distributed trace data to revise incorrect trace data in accordance with the disclosed technology. In this example, at 452, aggregated distributed trace data, e.g. trace data from aggregated distributed trace database 340, is searched for incorrect trace data, such as incomplete, broken or wrong traces. When an incorrect trace is found, control branches at 454 to 456 to obtain dependency graph data for the system architecture. At 458, the dependency graph data for the system architecture and timestamp data from the trace data can be utilized to revise the incorrect trace data, e.g. restore links, etc., and the revised trace data replaces the incorrect trace data in the aggregated distributed trace database.

Figure 4E:
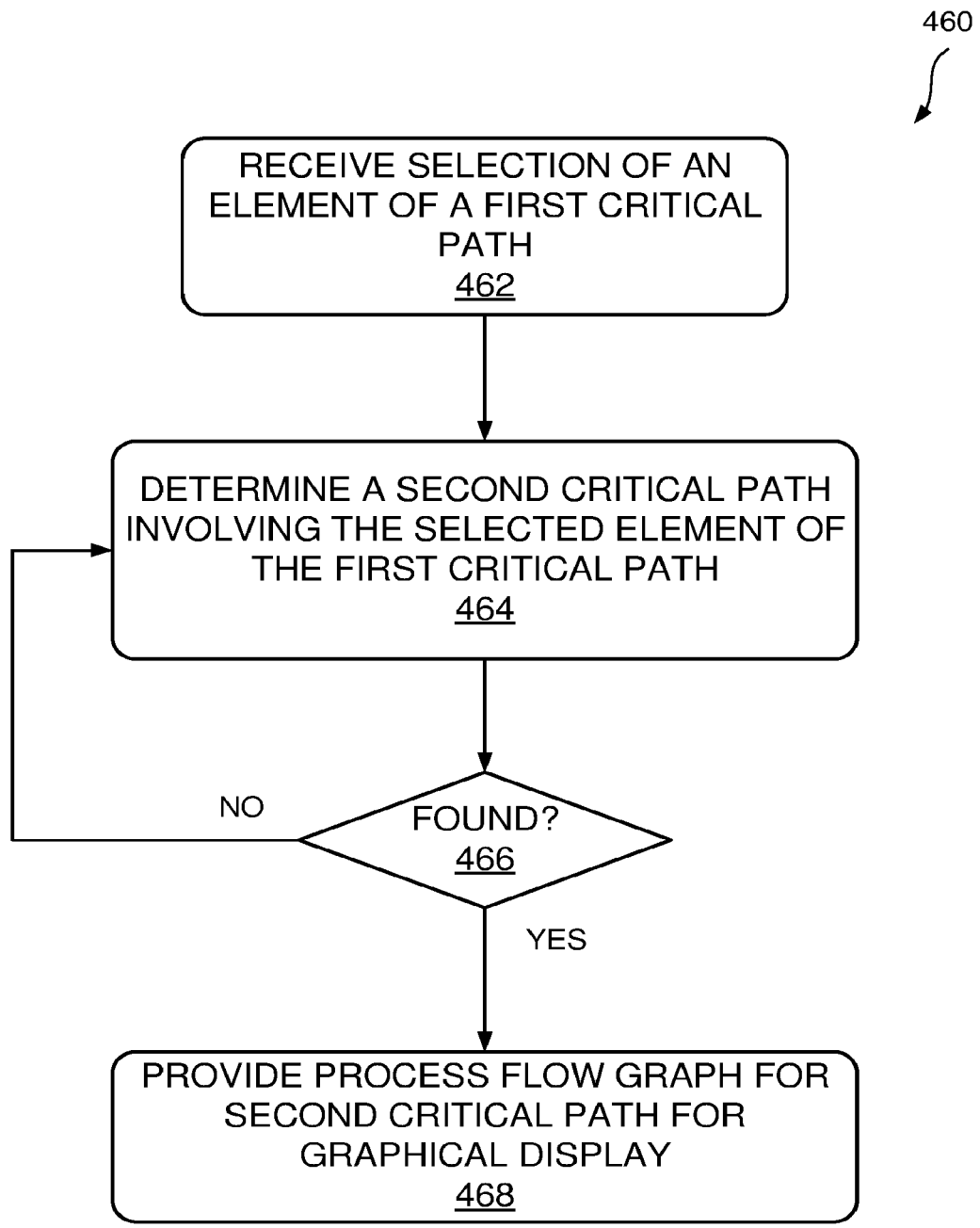
FIG. 4E is a control flow diagram illustrating an example of a process for determining a second critical path involving a selected element of a first critical path in accordance with the disclosed technology.

FIG. 4E is a control flow diagram illustrating an example of a process 460 for determining a second critical path involving a selected element of a first critical path in accordance with the disclosed technology. For example, when the first critical path is graphically displayed on a UI, the user can select an element of the first critical path for determination of whether the element is included in another critical path.

At 462, selection of an element of a first critical path is received. At 464, process flow graphs in a graphical trace database are searched to determine whether a second critical path involving the selected element of the first critical path can be found. If the second critical path is found, control branches at 466 to 468 to provide the process flow graph for the second critical path for graphical display to the user.

Figure 4F:
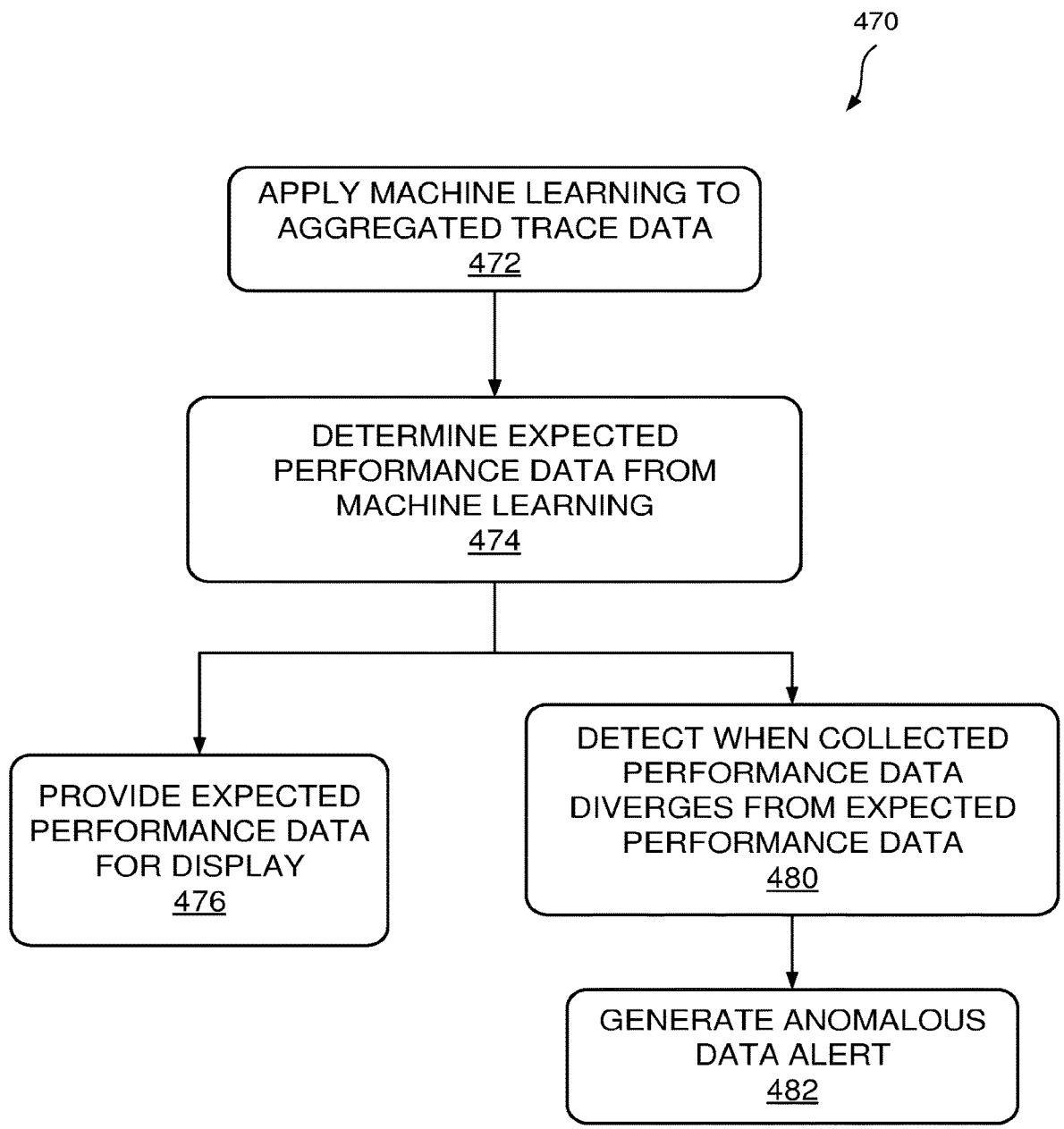
FIG. 4F is a control flow diagram illustrating an example of a process for applying machine learning to process flow graph data to determine expected performance data for process flow graphs in accordance with the disclosed technology.

FIG. 4F is a control flow diagram illustrating an example of a process 470 for applying machine learning to aggregated distributed trace data to determine expected performance data or anomalous data from aggregated distributed trace data in accordance with the disclosed technology. At 472, machine learning processing is applied to aggregated distributed trace data for a system. At 474, the machine learning is used to determine expected performance data for the system. In one example, at 476, the expected performance data is provided for display to a user. In another example, at 480, when divergence of collected performance data from the expected performance data is detected, then, at 482, an anomalous data alert is generated and can be provided for display to a user.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

Figure 6:
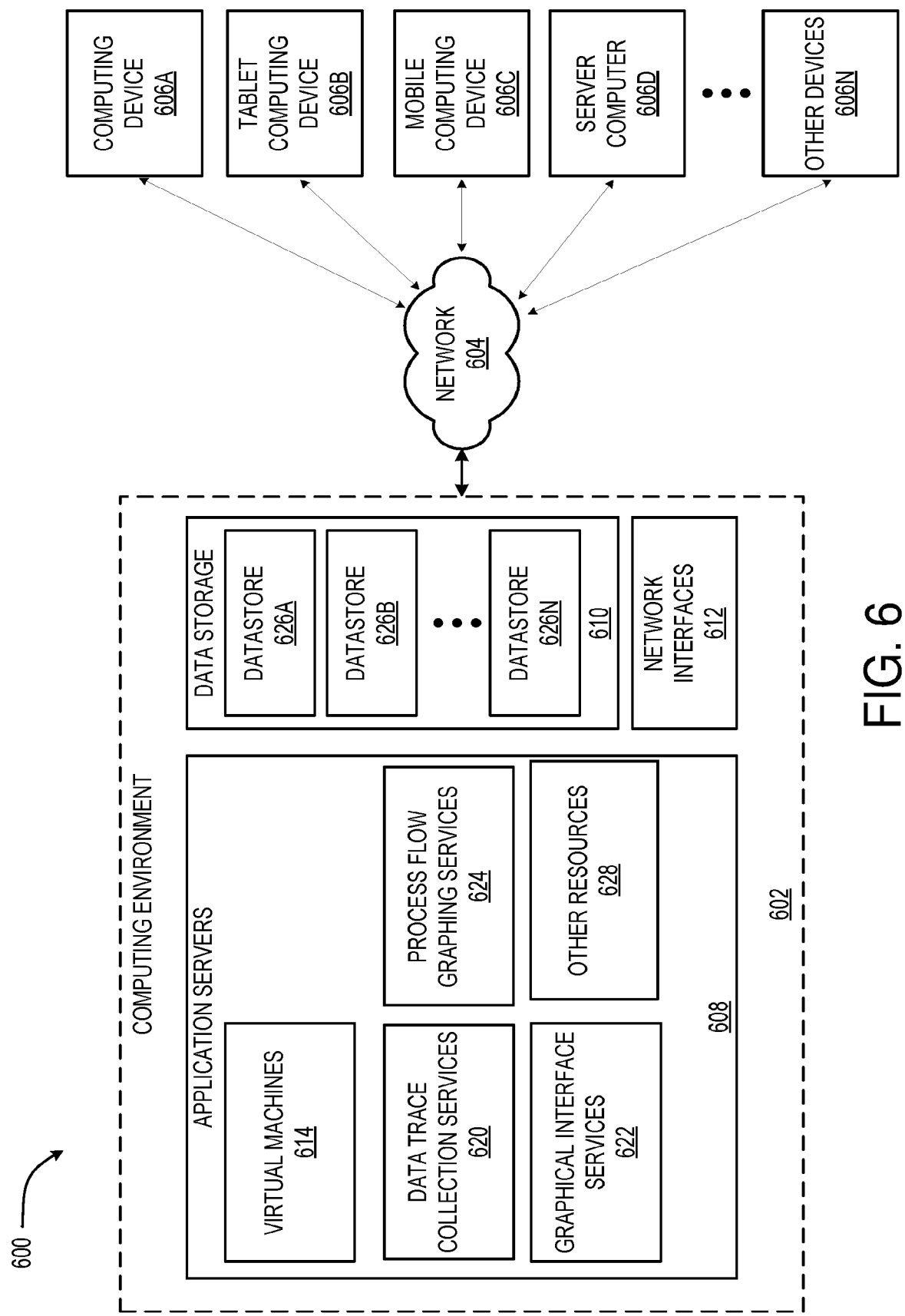
FIG. 6 is a diagram illustrating a distributed computing environment capable of implementing aspects of the techniques and technologies presented herein.

Computer Architectures for Use in Graph Analysis of Aggregated Distributed Trace Flows Note that at least parts of the processes and operations pertaining to graph analysis and database for aggregated distributed trace flows described herein may be implemented in one or more servers, such as computer environment 600 in FIG. 6, or the cloud, and data defining the results of user control input signals translated or interpreted as discussed herein may be communicated to a user device for display. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of FIGURES above, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
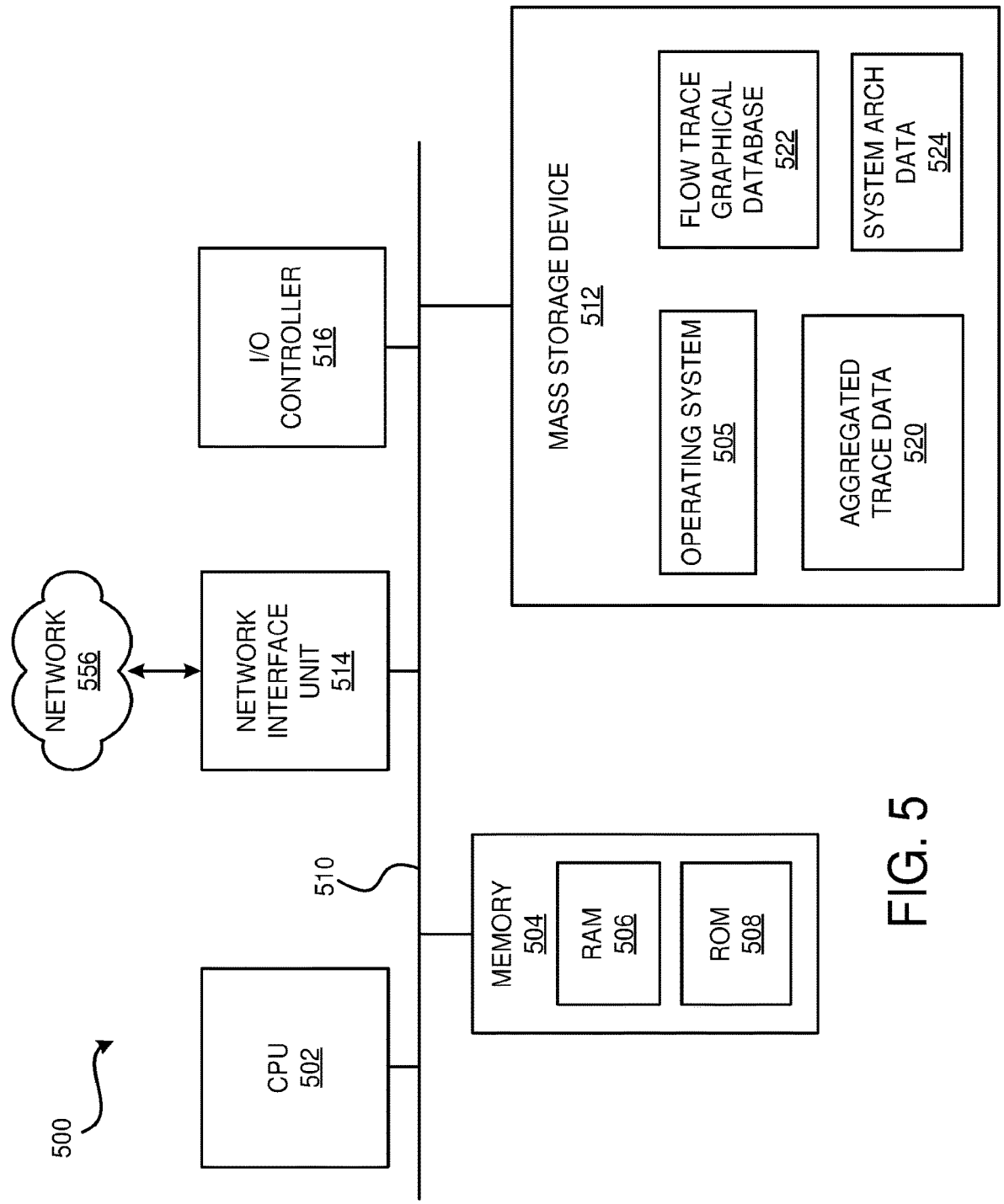
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices in FIG. 1A, capable of executing the program components described herein. Thus, the computer architecture 500 illustrated in FIG. 5 illustrates an architecture for a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as aggregated distributed trace data 520, graphical flow data 522 or system architecture data), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for function level permissions control for graph analysis and database for aggregated distributed trace flows. Thus, the distributed computing environment 600 illustrated in FIG. 6 can be utilized to execute many aspects of the software components presented herein. For example, the distributed computing environment 600 can be utilized to execute one or more aspects of the software components described herein. Also, the distributed computing environment 600 may represent components of the graph analysis and database for aggregated distributed trace flows platform discussed above.

According to various implementations, the distributed computing environment 600 includes a computing environment 602 operating on, in communication with, or as part of the network 604. The network 604 may be or may include the network 656, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 6. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for graph analysis of aggregated distributed trace flows. It should be understood that this configuration is illustrative only and should not be construed as being limiting in any way.

The application servers 608 can also host data trace collection services module 620, which collects the trace data described above, and process flow graphing services module 624, which can facilitate the graph analysis described above. Graphical interface services 622 can provide services to support the UIs described above for visualizing the process flow graphs described above.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for graph analysis and database for aggregated distributed trace flows described herein. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for graph analysis and database for aggregated distributed trace flows described herein, among other aspects.

Figure 7:
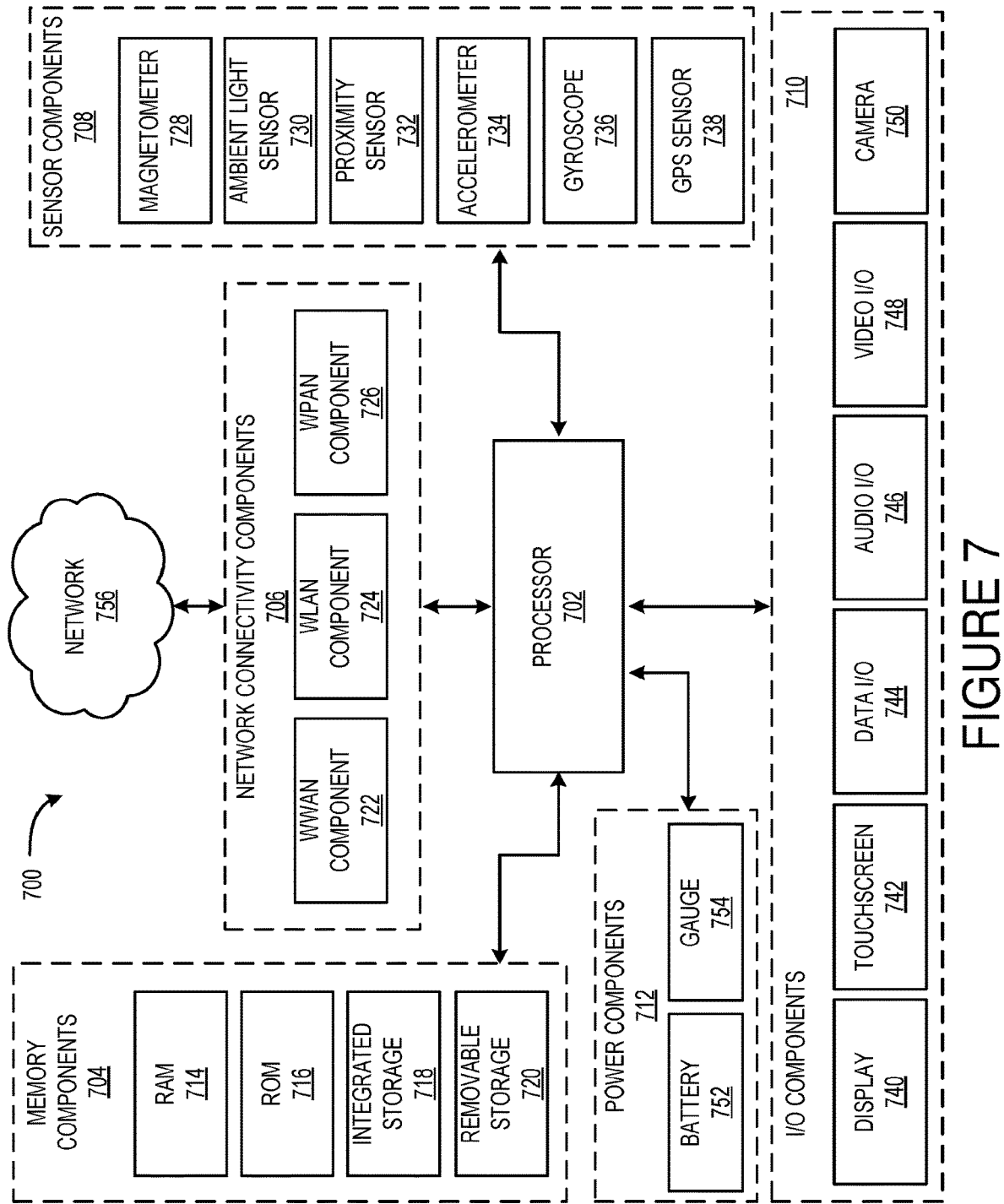
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for the graph analysis and database for aggregated distributed trace flows described herein. The computing device architecture 700 is applicable to computing devices that can manage graph analysis and database for aggregated distributed trace flows described herein. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the devices shown in FIG. 1 and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA5000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving graph analysis and database for aggregated distributed trace flows. The specific examples of different aspects of graph analysis and database for aggregated distributed trace flows described herein are illustrative and are not intended to limit the scope of the techniques shown.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method comprising:
   obtaining, by an application server, raw distributed trace data for a large-scale distributed system from a plurality of distributed tracing clients in the large-scale distributed system;
   aggregating, by the application server, the raw distributed trace data into aggregated distributed trace data;
   pre-processing, by the application server, the aggregated distributed trace data to repair at least one trace that is incomplete, broken or incorrect using an infrastructure design for the large-scale distributed system, the infrastructure design comprising a dependency graph indicating dependencies among a plurality of devices and services in the large-scale distributed system independent of the raw distributed trace data;
   generating, by the application server, a plurality of process flow graphs from the pre-processed aggregated distributed trace data;
   storing, by the application server, the plurality of process flow graphs in graph-based storage in communication with the application server;
   processing a graph query using the graph-based storage to determine a first critical path from the plurality of process flow graphs based on the infrastructure design for the large-scale distributed system including the dependency graph indicating dependencies among the plurality of devices and services in the large-scale distributed system; and
   providing a process flow graph corresponding to the first critical path for graphical display.

2. The computer-implemented method of claim 1, wherein the first critical path is determined based on the infrastructure design for the system and at least one selected from the following: a traffic volume, an error rate, and a latency for at least one element of each of the plurality of process flow graphs.

3. The computer-implemented method of claim 1, wherein the method further comprises:
   merging a first process flow graph of the plurality of process flow graphs with a second process flow graph of the plurality of process flow graphs, when the second process flow graph includes the first process flow graph and the second process flow graph is longer than the first process flow graph.

4. The computer-implemented method of claim 1, wherein providing the process flow graph corresponding to the first critical path for graphical display comprises:
   providing performance data for at least one element of the process flow graph corresponding to the first critical path for graphical display.

5. The computer-implemented method of claim 1, wherein the method further comprises:
   receiving a selection of at least one element of the process flow graph corresponding to the first critical path;

determining a second critical path involving the selected element; and providing a process flow graph corresponding to the second critical path for graphical display.

6. The computer-implemented method of claim 1, wherein the method further comprises:

receiving a selection of at least one element of the infrastructure design for the system; and wherein the first critical path is determined based on the selected element of the infrastructure design for the system.

7. One or more computer storage media storing computer-useable instructions that, when used by a computing device, cause the computing device to perform operations, the operations comprising:

obtaining, by an application server, raw distributed trace data for a large-scale distributed system from a plurality of distributed tracing clients in the large-scale distributed system;

aggregating, by the application server, the raw distributed trace data into aggregated distributed trace data;

pre-processing, by the application server, the aggregated distributed trace data to repair at least one trace that is incomplete, broken or incorrect using an infrastructure design for the large-scale distributed system, the infrastructure design comprising a dependency graph indicating dependencies among a plurality of devices and services in the large-scale distributed system independent of the raw distributed trace data;

generating, by the application server, a plurality of process flow graphs from the pre-processed aggregated distributed trace data;

storing, by the application server, the plurality of process flow graphs in graph-based storage in communication with the application server;

processing a graph query using the graph-based storage to determine a first critical path from the plurality of process flow graphs based on the infrastructure design for the large-scale distributed system including the dependency graph indicating dependencies among the plurality of devices and services in the large-scale distributed system; and providing a process flow graph corresponding to the first critical path for graphical display.

8. The one or more computer storage media of claim 7, wherein the first critical path is determined based on the infrastructure design for the system and at least one selected from the following: a traffic volume, an error rate, and a latency for at least one element of each of the plurality of process flow graphs.

9. The one or more computer storage media of claim 7, wherein the operations further comprise:

merging a first process flow graph of the plurality of process flow graphs with a second process flow graph of the plurality of process flow graphs, when the second process flow graph includes the first process flow graph and the second process flow graph is longer than the first process flow graph.

10. The one or more computer storage media of claim 7, wherein providing the process flow graph corresponding to the first critical path for graphical display comprises:

providing performance data for at least one element of the process flow graph corresponding to the first critical path for graphical display.

11. The one or more computer storage media of claim 7, wherein the operations further comprise:

receiving a selection of at least one element of the process flow graph corresponding to the first critical path;

determining a second critical path involving the selected element; and providing a process flow graph corresponding to the second critical path for graphical display.

12. The one or more computer storage media of claim 7, wherein the operations further comprise:

receiving a selection of at least one element of the infrastructure design for the system; and wherein the first critical path is determined based on the selected element of the infrastructure design for the system.

13. A computer system comprising:

a processor; and a computer storage medium storing computer-useable instructions that, when used by the processor, causes the computer system to perform operations comprising:

obtaining, by an application server, raw distributed trace data for a large-scale distributed system from a plurality of distributed tracing clients in the large-scale distributed system;

aggregating, by the application server, the raw distributed trace data into aggregated distributed trace data;

pre-processing, by the application server, the aggregated distributed trace data to repair at least one trace that is incomplete, broken or incorrect using an infrastructure design for the large-scale distributed system, the infrastructure design comprising a dependency graph indicating dependencies among a plurality of devices and services in the large-scale distributed system independent of the raw distributed trace data;

generating, by the application server, a plurality of process flow graphs from the pre-processed aggregated distributed trace data;

storing, by the application server, the plurality of process flow graphs in graph-based storage in communication with the application server;

processing a graph query using the graph-based storage to determine a first critical path from the plurality of process flow graphs based on the infrastructure design for the large-scale distributed system including the dependency graph indicating dependencies among the plurality of devices and services in the large-scale distributed system; and providing a process flow graph corresponding to the first critical path for graphical display.

14. The computer system of claim 13, wherein the first critical path is determined based on the infrastructure design for the system and at least one selected from the following: a traffic volume, an error rate, and a latency for at least one element of each of the plurality of process flow graphs.

15. The computer system of claim 13, wherein the operations further comprise:

merging a first process flow graph of the plurality of process flow graphs with a second process flow graph of the plurality of process flow graphs, when the second process flow graph includes the first process flow graph and the second process flow graph is longer than the first process flow graph.

16. The computer system of claim 13, wherein providing the process flow graph corresponding to the first critical path for graphical display comprises:

providing performance data for at least one element of the process flow graph corresponding to the first critical path for graphical display.

17. The computer system of claim 13, wherein the operations further comprise:
   receiving a selection of at least one element of the process flow graph corresponding to the first critical path;
   determining a second critical path involving the selected element; and
   providing a process flow graph corresponding to the second critical path for graphical display.

\* \* \* \* \*